US006769049B1

(12) United States Patent
Bernard et al.

(10) Patent No.: US 6,769,049 B1
(45) Date of Patent: *Jul. 27, 2004

(54) MEMORY ACCESS IN A COMPUTER SYSTEM HAVING PARALLEL EXECUTION PIPELINES

(75) Inventors: Bruno Bernard, Echirolles (FR); Nicolas Grossier, Georges-de-Commiers (FR); Ahmed Dabbagh, Saint-Egrève (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/563,473

(22) Filed: May 2, 2000

(30) Foreign Application Priority Data

May 3, 1999 (EP) ............................................ 99410057

(51) Int. Cl.[7] .............................................. G06F 13/00
(52) U.S. Cl. ...................................... 711/154; 711/169
(58) Field of Search ................................. 711/154, 169

(56) References Cited

U.S. PATENT DOCUMENTS

| | | | | |
|---|---|---|---|---|
| 5,742,831 A | | 4/1998 | Creta ........................ 395/732 |
| 5,754,812 A | * | 5/1998 | Favor et al. ................. 712/214 |
| 5,918,033 A | * | 6/1999 | Heeb et al. .................. 712/217 |
| 6,094,711 A | * | 7/2000 | Wong ......................... 710/307 |
| 6,119,204 A | * | 9/2000 | Chang et al. ............... 711/141 |
| 6,240,509 B1 | * | 5/2001 | Akkary ....................... 711/207 |
| 6,317,810 B1 | * | 11/2001 | Lopez-Aguado et al. ... 711/120 |

FOREIGN PATENT DOCUMENTS

EP     0 871 109     10/1998

OTHER PUBLICATIONS

Gathering Store Instructions in a Superscalar Processor, IBM Technical Disclosure Bulletin, vol. 39, No. 9, Sep. 1996, pp. 103–106, XP000638245.

* cited by examiner

Primary Examiner—Reba I. Elmore
(74) Attorney, Agent, or Firm—Lisa K. Jorgenson; James H. Morris; Wolf, Greenfield & Sacks, P.C.

(57) ABSTRACT

A computer memory access controller receives load and store requests from a plurality of parallel execution pipelines and forms queues of store and load addresses. A comparator compares load addresses with store addresses in a store address queue and selects a store before load if an address match is found, but selects a load before a store if no address match is found.

24 Claims, 5 Drawing Sheets

MEMORY ACCESS IN A COMPUTER SYSTEM HAVING PARALLEL EXECUTION PIPELINES

The invention relates to apparatus and methods for accessing a computer memory.

BACKGROUND OF THE INVENTION

Computer systems may comprise a plurality of parallel execution pipelines used to generate access addresses for load and store operations in the memory, as well as data for storing in the memory. For instructions which enter the pipelines in the same cycle, there may be different times required in the execution pipelines before results are available for use in memory accesses. Some parallel instructions may require more cycles in the relevant execution pipeline and this is particularly so in the case of pipelines used for arithmetic calculations. To allow access decoupling between pipelines generating addresses and those generating data values, it may be desirable to store addresses and data values in a memory access unit.

It is an object of the present invention to provide improved apparatus and methods for controlling access to a computer memory.

SUMMARY OF THE INVENTION

The invention provides a computer system having a memory, a plurality of parallel execution pipelines, and a memory access controller. At least one first parallel execution pipeline forms part of a data unit operable to provide data for storing in the memory, and at least one second parallel execution pipeline forms part of an address unit operable to address the memory for load or store accesses to the memory. The memory access controller includes circuitry for forming a store address queue which has addresses for store operations in the memory, load address storage which has addresses for load operations in the memory, and a data queue for data awaiting a store operation in the memory. The memory access controller has selector circuitry responsive to both the store address queue and to load addresses received by the controller and operable to select either a store or a load operation. The selector circuitry is arranged to compare addresses on the store address queue with a received load address and to select a load operation before a store operation if no address match is found in the comparison, and to select a store operation before a load operation if an address match is found. Preferably the received load address is put on a load address queue if a store operation is selected first.

Preferably the memory access controller includes a guard value queue holding guard values corresponding to store accesses in the store address queues, the guard values indicating if respective memory accesses are to be effected or not. The controller includes control circuitry to determine a guard value for the queue for each operation in the store address queues and to control whether the access is effected in accordance with the guard value.

Preferably an interface is provided between the memory access controller and the data and address units, the interface including at least one load data queue for data which has been received from load access operations in the memory.

Preferably the memory forms a plurality of separately addressable regions including X and Y memory regions, with separate queues being provided in the data memory controller for data awaiting store operations in the X and Y memory regions. Preferably separate queues are provided in the data memory controller for store addresses and load addresses for use in the X and Y memory regions. Preferably the memory access controller includes at least one data routing queue for selectively adding data to the X or Y store data queue. Preferably the memory access controller includes at least one guard routing queue for selectively adding guard values to an X or Y guard value queue.

Preferably the plurality of parallel execution pipelines include at least two pipelines in the data unit for executing arithmetic operations and at least two pipelines in the address unit for executing memory addressing operations. Preferably transfer circuitry is provided to add data from any pipeline in the data unit to either the X or Y store data queues and to add load or store addresses from any pipeline in the address unit to either the X or Y address queues in the memory access controller. Preferably the memory access controller includes at least one store data queue for data from the data unit and at least one store data :queue for data from the address unit. Preferably clock circuitry is provided to maintain the required order of execution of a plurality of instructions which enter the parallel pipelines in the same cycle.

The invention also includes a method of operating a computer system by executing instructions in a plurality of execution pipelines. At least one of the pipelines provides data for storing in a memory and at least one of the pipelines forms an address for a load or store access to the memory. The method includes forming a store address queue which has addresses for store operations in the memory, forming a load address storage which has addresses for load operations in the memory, and forming a data queue for data awaiting a store operation in the memory, and selecting either a store or a load operation by comparing addresses on the store address queue with a received load address to determine if any address match is found. In response to an address match, the method includes selecting a store operation before a load operation, and in the absence of an address match includes selecting a load operation before a store operation.

Preferably the method includes forming a queue of guard values corresponding to store accesses in the store address queues, determining for each store address the guard value for the respective operation in the store address queues and determining whether memory access is effected in accordance with the guard value.

DESCRIPTION OF THE PREFERRED EMBODIMENT

Figure 1:
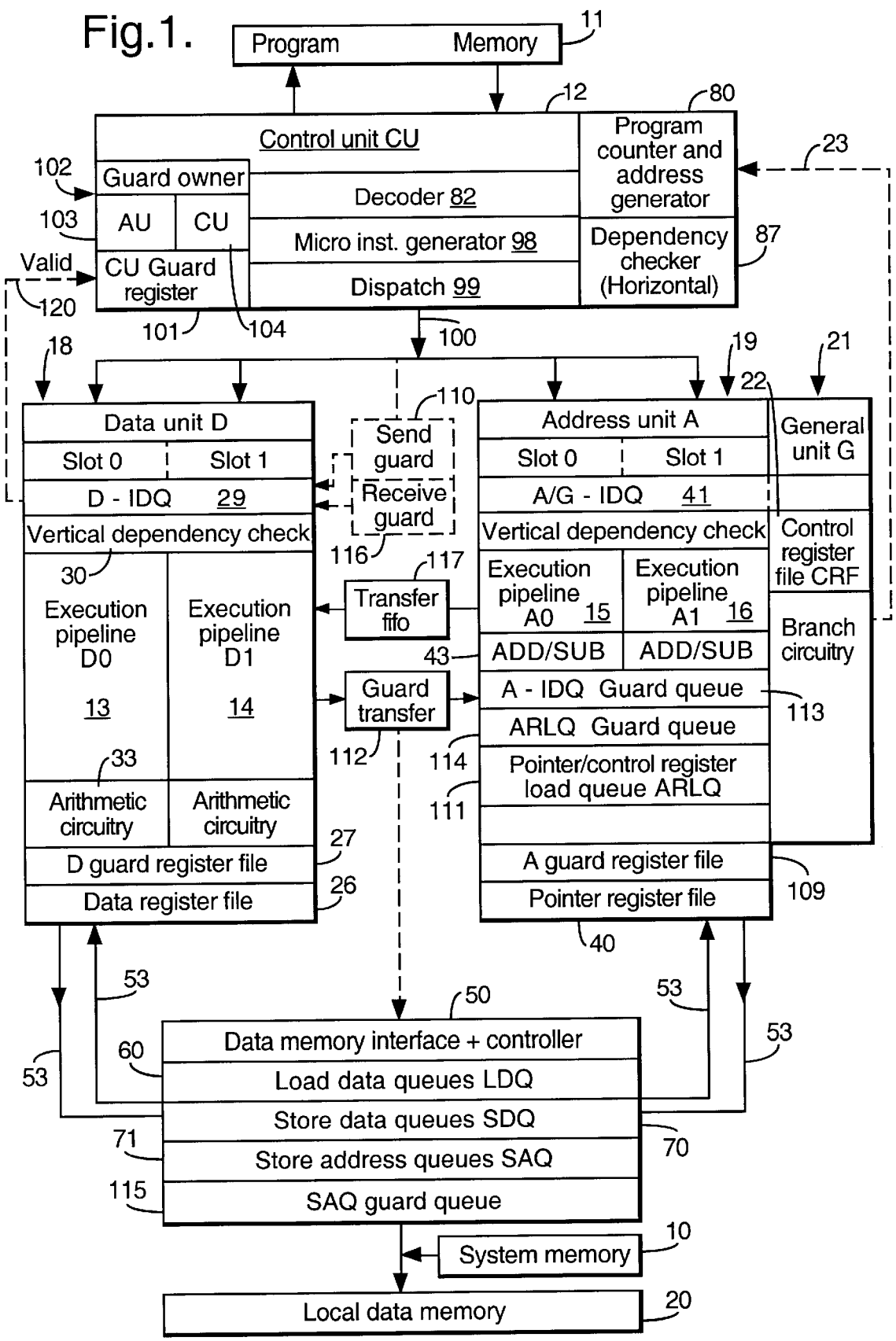
FIG. 1 shows a computer system in accordance with the present invention.

The computer system of this example is arranged for the parallel execution of a plurality of instructions and is particularly suited to providing high digital signal processing (DSP) performance. Instructions are held in a program memory 11 and after passing through a control unit 12 are supplied to four parallel execution pipelines 13,14,15 and 16. Pipelines 13 and 14 are shown as slot 0 and slot 1 of a data unit arranged to execute instructions carrying arithmetic operations. Pipelines 15 and 16 are shown as slot 0 and slot 1 of an address unit 19 used to execute instructions for memory accesses to a data memory 20. Slot 1 or Slot 0 of the address unit 19 may also be used to supply instructions to a general unit 21 which shares some resources with the address unit 19. The general unit 21 includes a control register file 22 as well as branch circuitry which is used to provide instruction branch information on line 23 to the control unit 12.

The two pipelines 13 and 14 in the data unit 18 share a common data register file 26 and a common guard register file 27 holding the master guard values which may be associated with the instructions. The two pipelines also derive instructions from a common instruction dispatch queue (D-IDQ) 29 in the data unit 18 and instructions in the queue 29 are checked for data dependency by common vertical dependency check circuitry 30 in the data unit 18. The sequence of operations in each of the pipeline stages in the data unit 18 includes an operand fetch, usually accessing one of the register files 26 or 27, followed by two execution stages which may use arithmetic circuitry 33, followed by a data write stage at which the result of an arithmetic operation is returned to the register file 26 and 27. A similar pipeline exists for both pipelines 13 and 14 on the data unit 18.

Similarly, for the address unit 19, both pipelines 15 and 16 access a common register file 40 holding pointer values for use in load or store operations in the data memory 20. The two pipelines each take their instructions from a common instruction dispatch queue (A-IDQ) 41 and a similar vertical dependency check is provided in common for both pipelines 15 and 16 in the address unit 19. The vertical dependency check is similar to that already referred to in the data unit 18. In executing instructions through the two pipelines 15 and 16, accesses will be made to the register file 40. Add and subtract units 43 may be used in execution of the instructions. Each of the pipelines 15 and 16 in the address unit 19 includes an operand fetch followed by an execution stage and an address write back stage. Both the data unit 18 and the address unit 19 are connected to the data memory 20 through a data memory interface and controller 50. The controller 50 is connected by buses 53 to both the data unit 18 and the address unit 19. The interface and controller 50 includes a plurality of queues each connected to the buses 53. These queues include load data queues (LDQ) 60 for data which has been read from memory and is awaiting loading into register files of the data unit 18 or address unit 19. The controller 50 also includes a plurality of store data queues (SDQ) 70 for data awaiting storage in the memory. Store address queues (SAQ) 71 are provided to indicate the locations in the memory at which the data is to be written. The memory includes a local memory 20 having X and Y memory regions as well as a system memory 10.

It will be understood that when instructions are executed to load data from the data memory 20 into the data register files of the data unit 18, the address unit 19 will access the data memory 20 and load the required data into the load data queues 60 prior to completing the update of the data register file 26 by transferring the data from the appropriate queue 60. Similarly, when instructions are executed to store data from the data unit 18 into the data memory 20, the appropriate data may be held in the store data queues 70 together with the store addresses in queue 71 prior to completing the store operation in the data memory 20.

By executing the memory addressing instruction in the address unit 19 in separate parallel pipelines from those provided in the data unit 18, the computer system operates access decoupling in that the memory accesses are effected independently of the arithmetic operations carried out within the data unit 18. This reduces the problem of memory latency. In a digital signal processing system which operates regular and repeated operations, the memory latency can be hidden from the executing program.

In the above description, all instructions which are fed through pipelines 13, 14, 15 and 16 are subject to a vertical dependency check, and if any data dependency is found which cannot be resolved by a bypass, the execution unit operates to cause a temporary stall in one of the pair of pipelines 13 or 14 or in the pair 15 and 16 so as to resolve the data dependency. The operand fetch stage in each of the pipelines looks to see the first entry in the IDQ and performs the vertical dependency check between the operands of this entry and the operands that are already in the pipelines. If there is no dependency problem, it performs the operand fetch and reads the micro-instructions from the IDQ. If there is a problem, it does not perform the operation fetch on that cycle, and the micro-instruction stays in the IDQ and starts again on the next cycle with the same micro-instructions. The delay may be induced by the instruction dispatch queue 29 or 41 providing a signal corresponding to no operand fetch being fed to the execution pipeline for each cycle of delay that is required in order to resolve the data dependency. It will be understood that a check for a data dependency includes any form of data, including data representing guard values.

The control unit 12 is also arranged to provide a horizontal dependency check. In this specification a data dependency between instructions that are supplied to the parallel pipelines in the same machine cycle is referred to as a horizontal dependency. The control unit 12 includes a program counter and address generator 80 to provide a memory address for an instruction fetch operation from the program memory 11. The machine may operate in a selected one of a plurality of instruction modes including superscalar modes of variable instruction bit length or in very long instruction word (VLIW) mode. The control unit 12 may include an instruction mode register to indicate the instruction mode in which the machine is operating.

In use, a plurality of instructions are obtained from the memory 11 in a single fetch operation during one cycle and are decoded by a decoder 82 in the control unit 12. They are checked for horizontal data dependency by dependency checking circuitry 87 to indicate if a horizontal data dependency has been located. After decoding, the instructions are used to generate microinstructions for each of the execution pipelines. The instructions from the decoder 82 are passed to a microinstruction generator 98 which generates a plurality of parallel microinstructions which are output by a dispatch circuitry 99 through parallel paths 100 to the four slots of the parallel execution pipelines 13, 14, 15 and 16 and for the general unit 21. If a horizontal dependency was located, the microinstructions on lines 100 would include an indication to the instruction dispatch queues of the data unit 18 or address unit 19 that some action, such as a pipeline stall, was necessary in the execution pipelines to resolve the horizontal dependency.

In this example, each instruction is provided with a guard indicator G between Go and G15 which is encoded into the instruction. If the indicator has a guard value which is true (has the value of 1), then the instruction will be executed normally (i.e., it updates the architectural state of the machine). If the indicator has a guard value which is false (has the value of 0), then normal execution of the instruction will not be completed (i.e., the architectural state of the machine is not changed by the instruction). Resolution of a guard value may be done in different pipeline stages of the machine.

The guard indicator for each instruction may be selected between G0 and G15 and in this particular example, the guard G15 is always true. The value true or false attributed to guards G0–G14 is, however, dependent upon the guard values held at any particular time in a guard register file. The master guard register file in this example is guard register file 27 in the data unit 18. However, a supplementary or shadow guard register file (normally copies of the master file 27) is provided by a control unit guard register file 101 in the control unit 12. The control unit 12 also includes a register 102 to indicate which unit is currently known to be the guard owner in respect of each guard indicator. Register 102 has a first bit 103 for each guard indicator, which if holding the value 1, indicates that the address unit 19 is currently the guard holder for that indicator. If bit 104 for each guard indicator is set to the value 1, then it indicates that the control unit 12 is currently the guard owner for that guard indicator. If neither bit 103 nor 104 is set, then the default condition indicates that the master guard register file 27 must be used so that the data unit 18 is the guard owner. The address unit also has a shadow guard register file 100 which may be updated by guard modifier instructions executed by the address unit 19. The guard values held in the guard register files can be changed by a guard modifier instruction (GMI) instruction executed by the data unit 18 or the address unit 19. Those executed by the data unit will update the master file 27 and the shadow file 101. Those executed by the address unit will update the shadow file lo and the master file 27 (and hence the shadow file 101).

In normal operation the guard register file 27 in the data unit 18 maintains the architectural state of the guard values Go to G14, and the register file is common to both execution pipelines 13 and 14. The operative values of the guard indicators are the same for all execution pipelines, although as will be explained below, the different pipelines may access different register files to obtain the guard values.

In this example the master register file for the guard values is held in the data unit 18, as it is the data unit that will most commonly execute instructions likely to change the value of the guards. Greater efficiency of execution cycles is therefore achieved by maintaining the master guard values in the register file which is directly accessed by execution of the instructions in the data unit 18. When instructions are fed through either slot 0 or slot 1 of the data unit 18, the required guard value may be taken directly from the master guard register file 27 in accordance with the guard indicator that accompanied the microinstructions fed into the data unit 18 from the control unit 12, unless the control unit 12 is the owner of the guard, in which case the guard value will have been taken from the shadow registers 101 in the control unit 12.

In the case of instructions to the address unit 19, the more general position will be the default condition in the guard owner register 102 indicating that guard ownership does not belong to the address unit 19 or the control unit 12, and consequently, the guard values required for execution of the instructions in the address unit 19 will need to be obtained from the guard register file 27 in the data unit 18. The microinstructions fed through lines 100 to the execution units will include supplying a "send guard" (sndG) instruction to the data unit 18 at the same time as supplying the appropriate microinstruction to the correct slot of the address unit 19. The "send guard" instruction will be slotted into the instruction dispatch queue 29 of the data unit 18 in the same cycle of operations as the microinstruction required for the address unit 19 is slotted into the instruction dispatch queue 41 for the address unit.

All micro-instructions in a given execution unit are always executed in order and all guard manipulations and transfers are maintained in order with respect to these micro-instructions. This guarantees the synchronicity of guard transfers (i.e. for every guard emission from a given execution unit there is an opposite guard reception in another execution unit, and all these are done in order.) The control unit has responsibility to generate the correct micro-instructions for guard transfers; the sending or receiving execution unit only sees the send or receive (respectively) .micro-instruction ( i.e., the action that it must do). In this way the correct sequencing occurs with the correct guard value being obtained from the guard register file 27 corresponding to the instruction being executed in the address unit 19.

The supply of the "send guard" instruction in such a situation is illustrated at 110 in the drawing. The address unit 19 has a queue of instructions 41 awaiting dispatch to the execution units. It also has a queue 111 (ARLQ) of items awaiting loading into the pointer or control registers 40 or 22. There are also queues 71 in the memory interface control 50 of store addresses awaiting a memory access as a result of partial execution of a store instruction in the address unit 19. When the address unit 19 awaits a guard transfer from the data unit 18, the instruction in the address unit 19 is stalled in the A-IDQ 41 or in the ARLQ 111 or in a store address queue 71 until the requested guard value is transmitted from the data unit 18 through guard transfer circuitry 112 to the required destination. The transfer of the correct guard value will occur when the data unit 18 executes in its pipeline operation the "send guard" instruction and the guard value which is transferred to either the address unit 19 or the data memory controller 50 will need to be held in a queue ready for continued execution of the instruction once the stall is terminated. The transferred guard value will be held in an A-IDQ guard queue 113 if the guarded instruction was stalled in the IDQ 41. If the stall was in the ARLQ queue 111, then the transferred guard value will be held in an ARLQ guard queue 114.

In the case of a store instruction where the store address had been added to a SAQ 71 in the memory controller 50, the guard value will be transferred from circuitry 112 to an SAQ guard queue 115 in the data memory controller 50 so that the memory access may be implemented in accordance with the entry in the SAQ 71 if the guard value transferred permits this. It will be seen that by this provision, the address unit can execute a memory store instruction as far as identifying the required store address and adding that address to a queue in the interface 50 prior to checking whether or not the guard value of the store instruction is true or false. The store operation will be held in a queue 71 until the guard value is checked and will only proceed to completion if the guard value is true. In each case where the guard value is transferred to the address unit 19 from the data unit 18, the stalled instruction for the address unit or general unit 21 will be resumed or rendered inoperative depending on the guard value transferred from the data unit file 27.

The use of the guard queues 113, 114 and 115 allows resynchronisation of the guard values with the microinstruction that caused the request "send guard" 110 to be sent to the data unit 18.

The above description for operation of a guarded store instruction indicates how the effective store address can be put on a queue 71 prior to resolving the guard value. The address unit 19 may be operated with an earlier stall in the execution of a store instruction so that the effective address is not calculated and fed to the memory controller 50 until after the guard value has been transferred and resolved. Similarly a guarded load instruction may be executed by the address unit 19 to access the memory and obtain the required data for addition to a load data queue 60 prior to resolving the guard value. Alternatively, the address unit may cause an earlier stall awaiting resolution of the guard value transferred from the data unit prior to obtaining the data from the memory and putting it into the queue 60. In the case where the data is obtained from the memory and put onto a load data queue 60 prior to resolution of the guard value, the appropriate register file 26, 40 or 22 is updated by a load operation from the load data queue 60 only if the guard value is found to be true. In the case of a false guard value, the register files are not updated and the appropriate execution unit effects a read of the load data queue 60 to remove the unwanted data from the queue without updating any destination register file.

Transfers of data between the data unit 18, address unit 19 and the data memory interface and controller 50 are carried out in accordance with Request/Grant protocol. In this way transfers of data occur only at controlled times which permit maintenance of the correct order of each operation. It will be understood that with parallel execution of instructions in slot 0 and slot 1 of the data unit as well as instructions in slot 0 and slot 1 of the address unit, it is necessary to maintain the correct ordering between slot 0 and slot 1. By use of the Request/Grant protocol, the memory controller will be aware of the required order between slot 0 and slot 1 through the operation of the Request/Grant protocol used by the address unit in providing the store or load address to the controller 50. However, in the case of store operations it is possible that data from the data unit may arrive at the controller 50 with the incorrect order between slot 0 and slot 1. In this case, some reordering of the data onto a store data queue (SDQ) will be effected by control circuitry 160 in the data memory controller.

All load operations issued by the address unit are carried out in strict order, and similarly all store operations issued by the address unit are carried out in strict order. It is, however, possible for load operations to by-pass and overtake store operations provided there is no conflict on the memory address that is to be used for the two operations. If there is any conflict then a store operation preceding a load must be carried out before the load can be effected.

Figure 2:
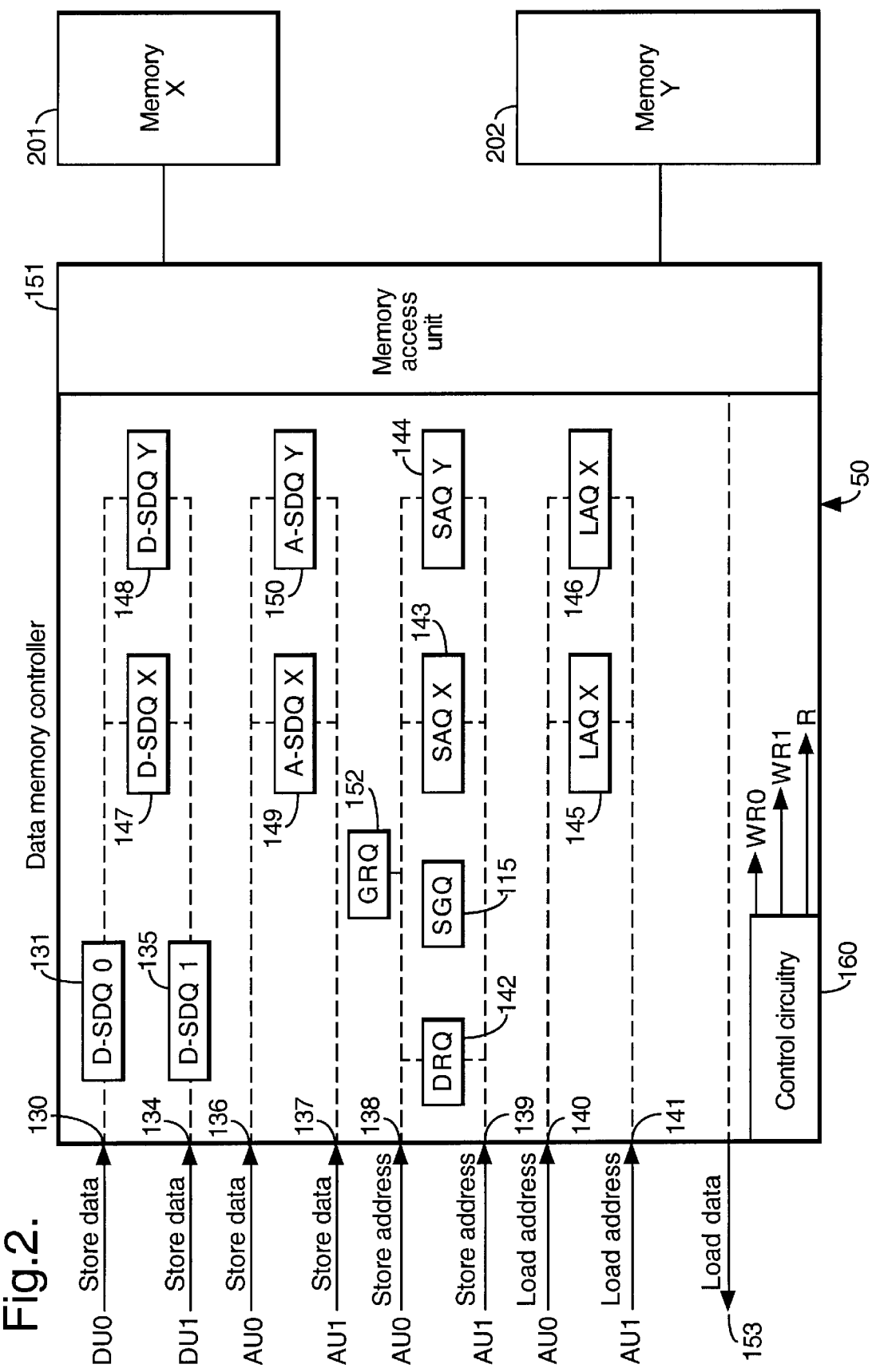
FIG. 2 illustrates in more detail a plurality of queues formed in a data memory controller forming part of the apparatus of FIG. 1.

FIG. 2 illustrates in more detail some of the queues that are held in the memory controller 50 together with the inputs which arrive from the data unit 18 and address unit 19. Input 130 provides a store data input from slot 0 of the data unit 18. Data is initially held on a queue 131 until information is available to clarify whether the data is to be written into the X memory 201 or the Y memory 202. Queue 131 is formed by a FIFO. All other queues in the controller 50 are similarly formed by a FIFO. A further input 134 receives data from slot 1 of data unit 18 and is held on a queue 135 similar to queue 131 until information is available on the data routing queue 142 to determine whether the data is to be written into the X or the Y memory.

A further input 136 receives data to be stored in the memory which has been supplied by slot 0 of the address unit 19. Input 137 similarly receives data to be stored which has been supplied by slot 1 of the address unit 19. The store addresses are input at 138 and 139 respectively from slot 0 and slot 1 of the address unit 19. Load addresses from slot 0 and slot 1 of the address unit 19 are input at 140 and 141 respectively. The store addresses which are input from the address unit also form the queue in a Data Routing queue 142. Data which is input from the data unit giving guard values necessary for store or load instructions is put on a queue 115 for guard values.

The addresses which are supplied from the address unit 19 will indicate both for store and load operations whether the memory to be accessed is the X or Y memory. Consequently, the store address details from inputs 138 and 139 are separated into a queue 143 for store addresses in the X memory and a further queue 144 for store addresses in the Y memory. Similarly, the load addresses which are input at 140 and 141 are separated into a first load address queue 145 for the X memory and a further load address queue 146 for the Y memory. Each of queues 145 and 146 may be bypassed if there is no conflict with a store address as will be described later. The data which is to be stored in the memory is put onto one of four possible queues. Queue 147 holds data from the data unit which is to be stored in the X memory. Queue 148 holds data from the data unit which is to be stored in the Y memory. Queue 149 holds data from the address unit which is to be stored in the X memory and queue 150 holds data from the address unit which is to be stored in the Y memory. A memory access unit 151 controls transfer of data to or from the queues in the controller to or from the memories 201 or 202.

In the case of load operations, data is read from the memory through the access unit 151 and forms an output 153 which transfers the data to a load data queue 60 as described with reference to FIG. 1.

Figure 5:
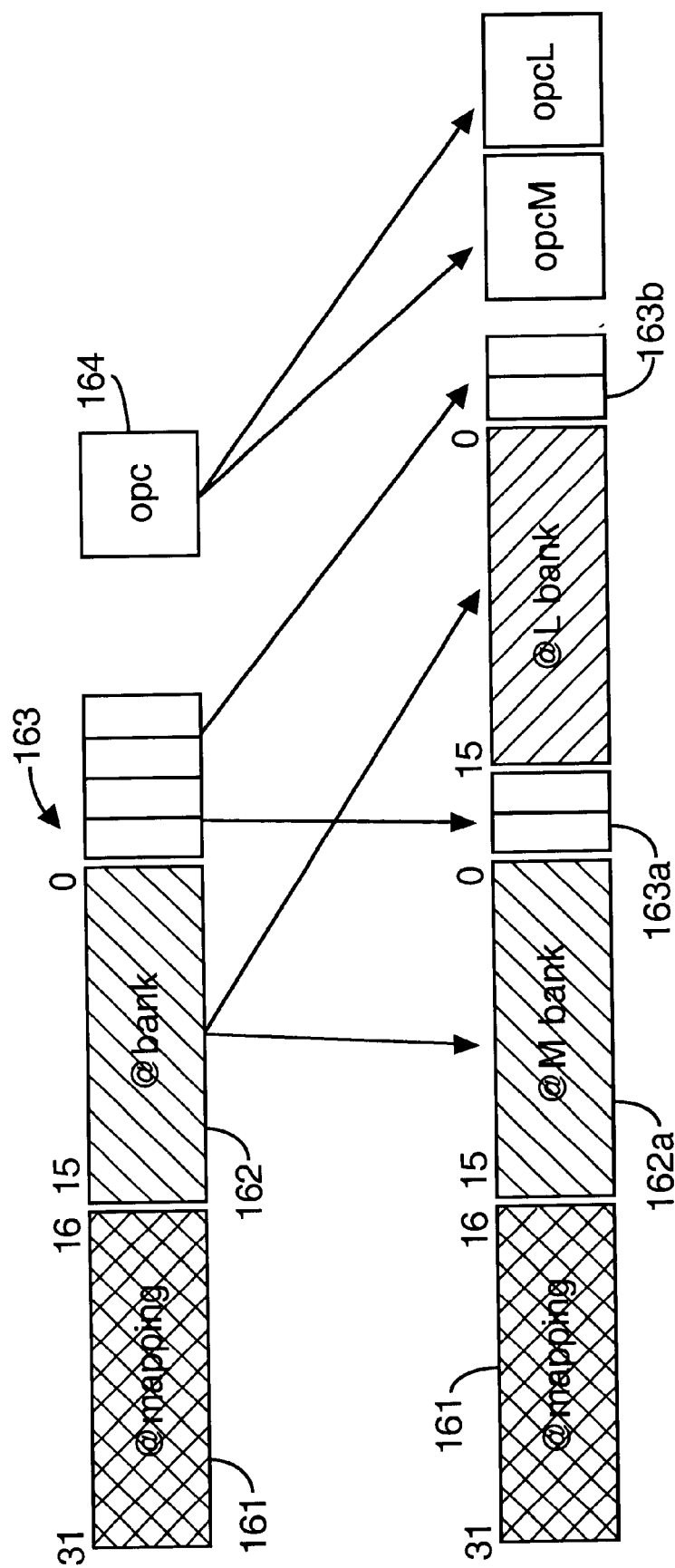
FIG. 5 shows the form of address and Opcode details supplied by the address unit of FIG. 1.

Inputs from the address unit on inputs 138–141 may be of the type shown in FIG. 5. A 32 bit word provides an address together with 4 bits 163 providing byte enable signals and an Opcode 164. The Opcode 164 is supplied to the control circuitry 160 to determine whether the operation is a load, store, or move. It may also be an NOP (no operation and so do nothing) or a barrier instruction to flush all operations present in the memory controller and awaiting action. The address includes a most significant set of bits 161 which determine the mapping of the memory location to be used, thereby indicating whether the memory access is for the X or Y memory or for a system's memory or further external memory. Each of the X and Y memories is formed of two banks, each bank including only half a word at each address in the bank. For this reason the least significant bits 162 of the address are duplicated (162a and 162b) to address both banks of each of the X and Y memories and the byte enable signals 163 are split (163a and 163b) so that two bits are supplied to each of the memory banks, respectively, thereby enabling byte selection from the address which is accessed in the bank.

Figure 3:
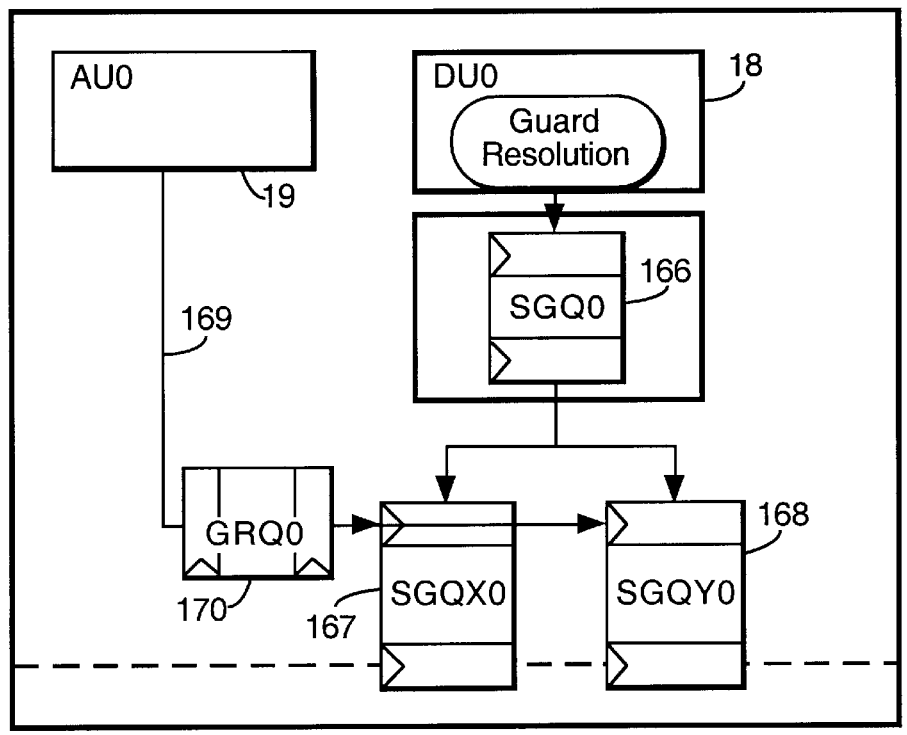
FIG. 3 shows more detail of the formation of some of the queues shown in FIG. 2.

The above description of FIG. 2 has described the formation of the data and address queues. Although for simplicity in FIG. 2 the store guard queue 115 has been shown as a single block, a plurality of store guard queues are formed for each of the X and Y memories and slots 0 and 1. Although separate data and address queues are formed respectively for the X and Y memories, each of these queues merges appropriate data or addresses which relate to either slot 0 or slot 1. However the guard queues need less storage capacity and so separate queues are formed for each of slots 0 and 1 without merging as for data and addresses. FIG. 3 shows the position solely for slot 0 and it will be understood that a similar arrangement is provided for slot 1. The address of the memory access is provided by slot 0 of the address unit 19 and the guard value is supplied from slot 0 of the data unit 18. The execution of instructions in the address unit 19 always proceeds in advance of corresponding instructions in the data unit and the data unit may need to calculate the correct value of the guard to be given to a particular guard designation. This resolution of the correct value is carried out in the data unit 18 and is supplied to a store guard queue 166 for slot 0. That queue is formed before there is any indication of whether the guard value is related to an access for the X or Y memory.

Whereas the data and address queues are of similar construction and consist of a FIFO with two input ports and one output port, the store guard queues have a single input port and a single output port. Each input port and output port is provided with a clocked flip-flop and each FIFO has rolling read and write pointers. The output of queue 166 is supplied to one of two alternative store guard queues 167 for the X memory and 168 for the Y memory. Address information from the address unit 19 is supplied on line 169 to a guard routing queue 170 for slot 0 and this controls input to the two queues 167 and 168. Depending on the address, entries from queue 166 will be added to either queue 167 or 168 so that they become associated with the correct store or load operations for the appropriate memory region X or Y.

Figure 4:
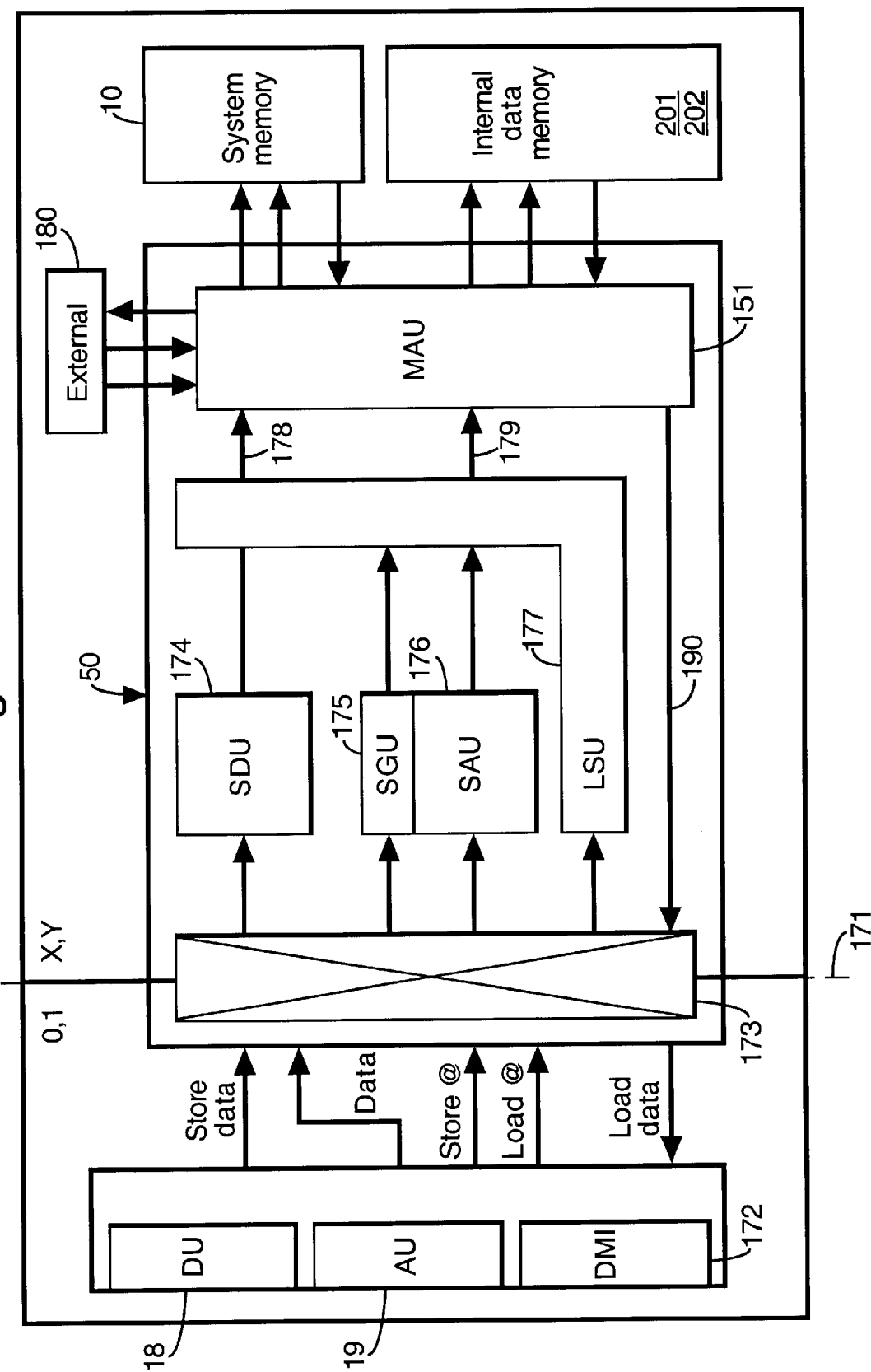
FIG. 4 illustrates the main components of the data memory controller of FIG. 1.

The main elements of the memory controller 50 are shown in FIG. 4. In addition to the data unit 18 and address unit 19 there is an interface unit 172 which provides the load data queues 60 shown in FIG. 1. To the left of the line marked 171 in FIG. 4, the signal lines are separately provided for slots 0 and 1, whereas to the right of line 171 the signals become merged from slot 0 and 1 but selectively divided for one of the X or Y memory regions 201 or 202. The signals from the address unit and data unit enter a cross bar switch circuitry 173 and are supplied to either a store data unit 174, a store guard unit 175, a store address unit 176 or a load store 177. The store data unit 174 includes the circuitry for the store data queues already referred to in FIG. 2. The store guard unit 175 provides the circuitry for forming the store guard queues described above. The store address unit 176 provides the circuitry for forming the store address queues referred to above. The load store unit 177 forms part of the control circuitry 160 which controls the addition and removal of entries from the various queues. When an access is to be made by the load store unit 177 outputs are made on lines 178 or 179 to the respective X or Y memories 201 or 202. These outputs are supplied to the memory access unit 151 which may also provide bidirectional access to the system memory 10 and permit access by an external bus 180 to the internal data memory.

Figure 6:
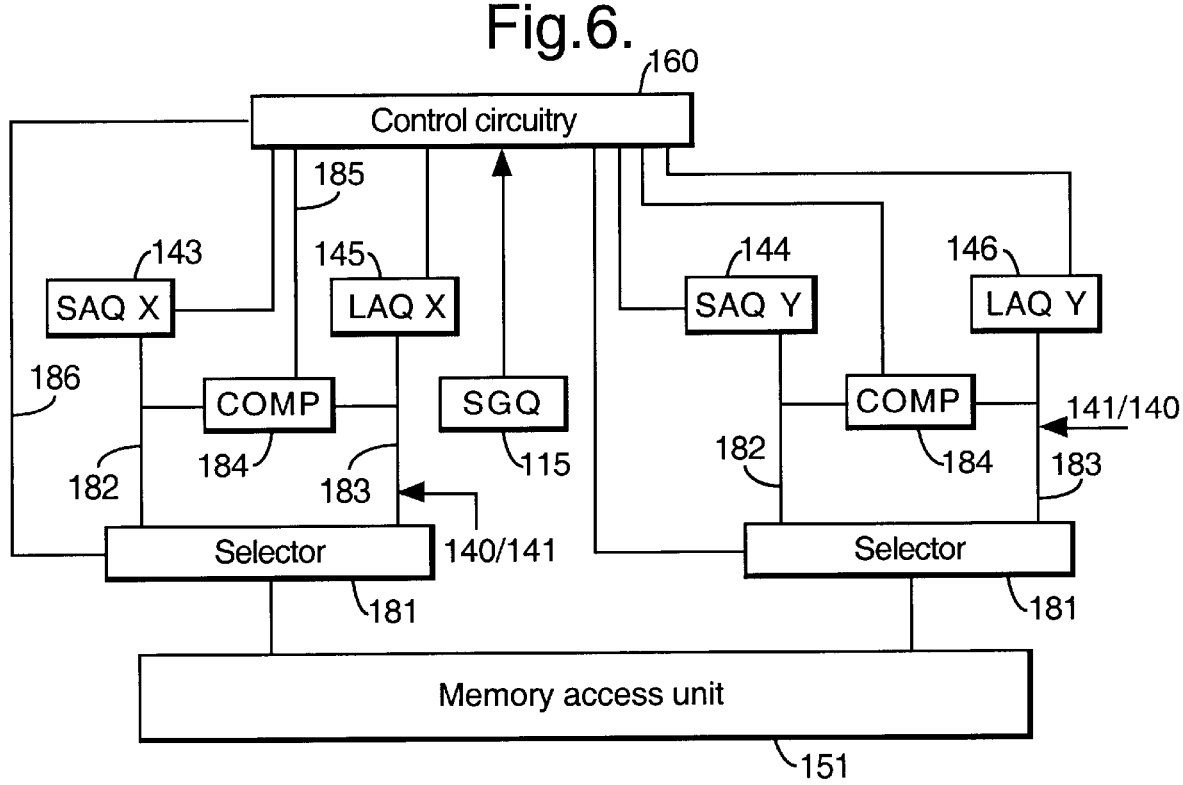
FIG. 6 shows more detail of the operation of the components shown in FIG. 4.

The manner of operating the load store unit 177 will be described with reference to FIG. 6. As shown, there are queues of store addresses and load addresses for each of the X and Y memories. The control circuitry 160 is arranged so that entries on the queues are removed in order in accordance with a normal FIFO operation. However, load operations will take priority over store operations unless there is conflict on the memory address required by the two operations. In that event store operations must take place before a load operation using the same memory location. The operation will be described with reference to the X queues shown in FIG. 6 although it will be understood that a similar operation applies for the Y queues.

A selector 181 determines whether the memory access unit 151 receives a load operation or a store operation from queue 143. The selector 181 receives one input 182 from the SAQX 143 on line 183; it receives the X memory load address input from 140 or 141. The signal's 182 and 183 are compared by a comparator 184 which provides a signal on line 185 to the control circuitry 160 to indicate whether the input load address and the store address queue 143 have any conflict of address location, thereby providing a match signal indicating a hit in an associate operation. The comparator 184 compares the load address with all valid entries in the store address queue. For any entries where a hit is located by the comparator 184, the signal is supplied to the control circuitry 160, which in turn provides a signal on line 186 to the selector 181 to ensure that the output 182 from the store address queue 143 is acted upon so as to change the value in the memory location prior to the load operation being carried out using that memory address. In that event the load address at input 140 or 141 is put on the load address queue 145 for later removal when no more store addresses conflict with that load address. If, however, no hit is found by the comparator 184, then the control circuitry operates the selector 181 to take the output 183 from the load address input 140 or 141 in preference to the store address queue output 182. In this way, the load operation will bypass the queue 145 and may take place in a single cycle, provided no hit arose in the comparison with the store addresses. The load address will then be discarded on the following cycle.

A similar operation occurs for the store address queue 144 and load address queue 146, and similar components have been marked with the same reference numerals as used for the X circuitry.

It will, however, be understood that the control circuitry 160 can only carry out the operation indicated by the Opcode 164 of FIG. 5 if the guard value associated with the instruction has been resolved as true or false, thereby indicating that the instruction should be carried out or not. As described with reference to FIG. 1, the guard indicator will accompany the address and Opcode supplied by the address unit to the data memory controller 50. However, when that case is put on the store address queue in the data memory controller 50, the value to be assigned to that guard indicator may not have been resolved by the data unit. When that value has been resolved, it is supplied to the correct guard value Q as described above with reference to FIGS. 2 and 3. The value is then held on an appropriate guard value Q, such as 167 or 168 of FIG. 3, although for simplicity this has been shown as a single element 115 in FIG. 6. The appropriate guard value is checked by the control circuit 160 corresponding to the store instruction which is being taken from one of the queues 143 or 144. If the guard value is true, then the execution of the access operation will continue. If however it is false, then the access is not executed. The entry on the store address Q will, however, be removed at the time its guard value is considered by the control circuitry 160, so that even if the memory access is not carried out, the entry is removed from the appropriate address queue.

In the case of store operations, the opcode supplied to the memory controller 160 will indicate if the store is speculative of whether the guard value has been resolved. If resolved and true, the store operation may go ahead without waiting for the guard value to arrive on the guard value queue. For load operations it is not necessary to resolve the guard value in the memory controller 160, as the data read from memory can be put onto a load data queue 60 in the interface and guard resolution effected before loading the data into the required register.

It will be appreciated that in the above example, the preference given to load operations over store operations where no conflict arises allows load values to be supplied along line 190 in FIG. 4 to the load queues formed in the interface 172, thereby reducing delay within the data unit 18 which may require the load value. Furthermore, the provision of store guard queues in the data memory controller 50 enables the address unit to avoid unnecessary delays by supplying load and store addresses to the data memory controller without waiting for resolution of the guard value by the data unit. The addresses are held in the data memory controller until the appropriate guard value is supplied from the data unit and the decision on whether to execute the memory access is carried out within the memory controller 50. In the above examples, each load address queue LAQ may be a single entry buffer or store.

The invention is not limited to the details of the foregoing example.

What is claimed is:

1. A computer system comprising:
   a memory;
   a plurality of parallel execution pipelines, the plurality of parallel execution pipelines including at least one first parallel execution pipeline forming part of a data unit operable to provide data for storing in the memory, and at least one second parallel execution pipeline forming part of an address unit operable to address said memory for load or store accesses to the memory;
   a memory access controller, said memory access controller including circuitry for forming a store address queue which has addresses for store operations in the memory, load address storage which has addresses for load operations in the memory, and a data queue for data awaiting a store operation in the memory, wherein the circuitry is operable to form at least one of: a store address queue having only addresses, a load address queue having only addresses, and a data queue having only data; and
   said memory access controller including selector circuitry responsive to both the store address queue and to load addresses received by said memory access controller and operable to select either a store operation or a load operation based on a comparison between received load addresses and addresses on the store address queue, said selector circuitry being arranged to compare addresses on the store address queue with a received load address and to select a load operation before a store operation if no address match is found in said comparison, and to select a store operation before a load operation if an address match is found.

2. The computer system according to claim 1, wherein said received load address is put on a load address queue when the address match is found, thereby selecting the store operation before the load operation.

3. The computer system according to claim 1, wherein said memory access controller includes a guard value queue holding guard values corresponding to store accesses in the store address queue, said guard values indicating if respective memory accesses are to be executed or not, said memory access controller including control circuitry to determine a guard value for said guard value queue for each operation in the store address queue and to control whether the operation is executed in accordance with the guard value.

4. The computer system according to claim 1, further comprising:
   an interface between said memory access controller and said data and address units, said interface including at least one load data queue for data which has been received from load access operations in the memory.

5. The computer system according to claim 1, wherein said memory access controller includes at least one store data queue for data from the data unit and at least one store data queue for data from the address unit.

6. The computer system according to claim 1, wherein clock circuitry is provided to maintain a required order of execution of a plurality of instructions which enter the plurality of parallel execution pipelines in a same cycle.

7. The computer system of claim 1, wherein the data unit is operable to provide only data for storing in the memory.

8. The computer system of claim 1, wherein the address unit is operable to only address said memory for load or store accesses.

9. The computer system of claim 1, wherein the circuitry is operable to form a store address queue having only addresses.

10. The computer system of claim 1, wherein the circuitry is operable to form a load address queue having only addresses.

11. The computer system of claim 1, wherein the circuitry is operable to form a data queue having only data.

12. The computer system according to claim 1, wherein the memory forms a plurality of separately addressable regions including X and Y memory regions, separate X and Y store data queues being provided in said memory access controller for data awaiting store operations in said X and Y memory regions.

13. The computer system according to claim 12, wherein separate queues are provided in said memory access controller for store addresses and load addresses for use in said X and Y memory regions.

14. The computer system according to claim 12, wherein said memory access controller includes at least one data routing queue for selectively adding data to one of the X and Y store data queues.

15. The computer system according to claim 12, wherein said memory access controller includes at least one guard routing queue for selectively adding guard values to an X or Y guard value queue.

16. The computer system according to claim 12, wherein the plurality of parallel execution pipelines include at least two pipelines in the data unit for executing arithmetic operations and at least two pipelines in the address unit for executing memory addressing operations.

17. The computer system according to claim 16, wherein transfer circuitry is provided to add data from any pipeline in the data unit to either of the X and Y store data queues and to add load or store addresses from any pipeline in the address unit to either of the X and Y address queues in said memory access controller.

18. A method of operating a computer system, comprising:
   executing instructions in a plurality of execution pipelines, at least one of the execution pipelines providing data for storing in a memory and at least one of the execution pipelines providing an address for a load or store access to the memory;
   forming a store address queue which has addresses for store operations in the memory, forming load address storage which has addresses for load operations in the memory, and forming a data queue for data awaiting a store operation in the memory, wherein at least one of:
      forming a store address queue includes forming a store address queue having only queues addresses, forming a load address queue includes forming a load address queue having only addresses, and forming a data queue includes forming a data queue having only data;
   comparing addresses on said store address queue with a received load address to determine if any address match is found; and selecting a store operation before a load operation in response to an address match and selecting the load operation before the store operation in response to an absence of an address match.

19. The method according to claim 18, further including:

forming a queue of guard values corresponding to store accesses in said store address queue;

determining for each store address a guard value for the respective operation in the store address queue; and determining whether memory access is executed in accordance with the guard value.

20. The method of claim 18, wherein forming a store address queue includes forming a store address queue having only addresses.

21. The method of claim 18, wherein forming a load address queue includes forming a load address queue having only addresses.

22. The method of claim 18, wherein forming a data queue includes forming a data queue having only data.

23. The method of claim 18, wherein at least one of the execution pipelines provides only data for storing in a memory.

24. The method of claim 18, wherein at least one of the execution pipelines provides only addresses for load or store accesses to the memory.

* * * * *

UNITED STATES PATENT AND TRADEMARK OFFICE
CERTIFICATE OF CORRECTION

PATENT NO. : 6,769,049 B1
DATED : July 27, 2004
INVENTOR(S) : Bernard et al.

It is certified that error appears in the above-identified patent and that said Letters Patent is hereby corrected as shown below:

Column 12,
Line 60, delete "queues".

Signed and Sealed this

Tenth Day of January, 2006

JON W. DUDAS
*Director of the United States Patent and Trademark Office*